United States Patent
Duesterwald et al.

(10) Patent No.: US 10,452,994 B2
(45) Date of Patent: Oct. 22, 2019

(54) VERSIONING OF TRAINED MODELS USED TO DELIVER COGNITIVE SERVICES

(71) Applicant: INTERNATIONAL BUSINESS MACHINES CORPORATION, Armonk, NY (US)

(72) Inventors: Evelyn Duesterwald, Millwood, NY (US); Maria R. Ebling, White Plains, NY (US); Liana L. Fong, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 1113 days.

(21) Appl. No.: 14/730,537

(22) Filed: Jun. 4, 2015

(65) Prior Publication Data

US 2016/0358098 A1 Dec. 8, 2016

(51) Int. Cl.
*G06N 20/00* (2019.01)
*G06F 9/445* (2018.01)
*G06F 8/71* (2018.01)
*G06N 20/20* (2019.01)

(52) U.S. Cl.
CPC .............. *G06N 20/00* (2019.01); *G06F 8/71* (2013.01); *G06F 9/44505* (2013.01); *G06N 20/20* (2019.01)

(58) Field of Classification Search
CPC ...... G06N 99/005; G06F 8/71; G06F 9/44505
See application file for complete search history.

(56) References Cited

U.S. PATENT DOCUMENTS

| | | | |
|---|---|---|---|
| 2007/0220034 A1 | 9/2007 | Iyer et al. | |
| 2012/0046966 A1* | 2/2012 | Chang | G06Q 50/24 705/3 |
| 2012/0239613 A1* | 9/2012 | Danciu | G06Q 10/06 707/603 |
| 2015/0339570 A1* | 11/2015 | Scheffler | G06N 3/04 706/16 |
| 2016/0148115 A1* | 5/2016 | Sirosh | G06N 99/005 706/11 |

OTHER PUBLICATIONS

P. Mell et al., "The NIST Definition of Cloud Computing", National Institute of Standards and Technology, Information Technology Laboratory, Sep. 2011, pp. 1-7.

* cited by examiner

*Primary Examiner* — Scott A. Waldron
*Assistant Examiner* — Kevin W Figueroa
(74) *Attorney, Agent, or Firm* — Law Office of Jim Boice (57) ABSTRACT

A method, system, and/or computer program product manages the lifecycle of trained models used to deliver cognitive services. One or more processors obtain and deploy a cognitive engine that utilizes artificial intelligence (AI), machine learning, and/or similar algorithms. One or more processors obtain and deploy a version of a trained model that includes data that supports cognitive operations of the cognitive engine within a cognitive service. In response to changes to the input used to produce the trained model, one or more processors obtain and deploy a subsequent version of the trained model in support of the cognitive service.

18 Claims, 6 Drawing Sheets

VERSIONING OF TRAINED MODELS USED TO DELIVER COGNITIVE SERVICES

BACKGROUND

The present disclosure relates to the field of computers, and specifically to the field of computers that delivers cognitive services. Still more specifically, the present disclosure relates to the field of versioning trained models used to configure and deploy a cognitive service.

SUMMARY

A method, system, and/or computer program product manages the lifecycle of trained models used to deliver cognitive services. One or more processors obtain and deploy a cognitive engine that utilizes artificial intelligence (AI), machine learning and/or similar algorithms. One or more processors obtain and deploy a version of a trained model that includes data that supports cognitive operations of the cognitive engine within a cognitive service. In response to changes to the input used to produce the trained model, one or more processors obtain and deploy a subsequent version of the trained model in support of the cognitive service.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
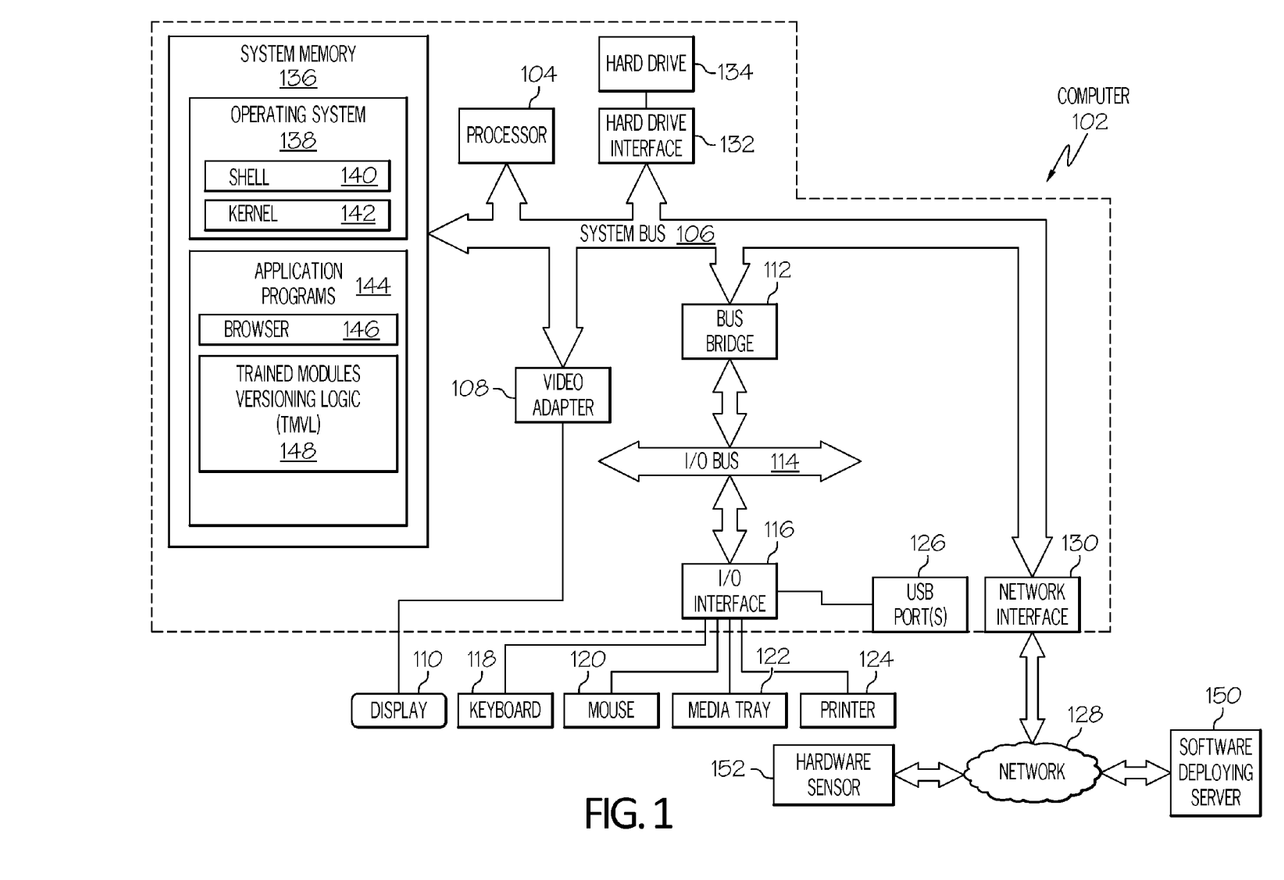
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or a hardware sensor 152 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include Trained Modules Versioning Logic (TMVL) 148. TMVL 148 includes code for implementing the processes described below, including those described in FIGS. 2-3. In one embodiment, computer 102 is able to download TMVL 148 from software deploying server 150, including in an on-demand basis, wherein the code in TMVL 148 is not downloaded until needed for execution. In one embodiment of the present invention, software deploying server 150 performs all of the functions associated with the present invention (including execution of TMVL 148), thus freeing computer 102 from having to use its own internal computing resources to execute TMVL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Cognitive Services and Solutions have lifespans that consist of phases of training phases (to produce a trained model) followed by phases of operations of the cognitive service and solutions using the trained model to solve cognitive requests. That is, the trained model that is produced during training is an integral part of the cognitive service that consists of both code (a cognitive engine) and data (the trained model). Supporting a robust ecosystem of Cognitive Services and Solutions requires the ability to rapidly develop and evolve cognitive services in the cloud. Such rapid cloud development is supported by a set of practices, principles, and tools to streamline the delivery of new code versions by automating, integrating, standardizing, and versioning the code development and operations process for the cognitive engine. Furthermore, as described herein and in accordance with novelty presented by the present invention, development of the trained model is also supported by a set of practices, principles, and tools in a uniform (i.e., not ad-hoc) manner, thus enabling upgrades to new versions of the trained model and roll-backs to earlier versions of the trained model. By placing the development of the cognitive engine and the trained model within a common operations and development environment, then cognitive engines and trained models can be mixed and matched to one another.

Figure 2:
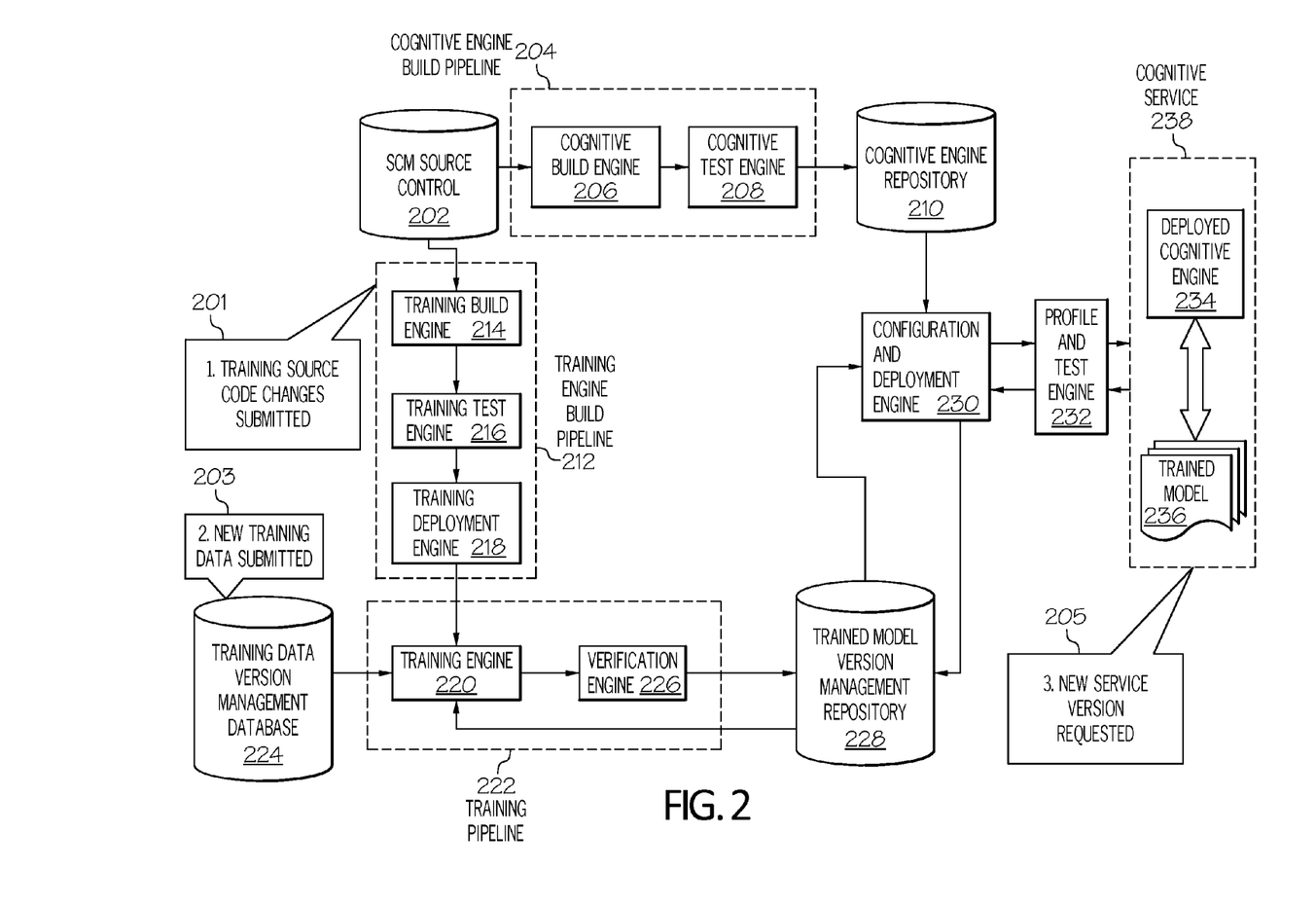
FIG. 2 illustrates an exemplary system and process used by the present invention to version trained models.

With reference now to FIG. 2, an exemplary system and process used by the present invention to managing the versioning and updating of trained models is presented.

A Source Control Management (SCM) 202 is a repository for versions of source codes for a cognitive engine and a training engine. Upon the creation of a new version, the build pipeline can be initiated that leads to: 1) deployment of a cognitive engine or 2) deployment of a training engine. A cognitive engine is hardware and software logic that is enabled, by a trained model, to sense, predict, infer, and otherwise emulate reasoning processes. That is, a cognitive engine may be able to evaluate data, answer questions, ask feedback questions, and otherwise emulate thought practices through the use of artificial intelligence (AI) and machine learning algorithms, rather than simply being programmed to respond statically to various inputs. The training engine is hardware and software that creates a set of data known as a trained model, which describes a process, environment, image, or other elements that are used to enable the cognitive engine to "think" (i.e., exhibit cognitive behavior).

For example, a cognitive engine may be hardware/software that is designed to detect shapes and colors in a digital photograph. The trained model created by the training engine contains specific details about the features of an object of interest within the digital photograph, such as a certain breed of dog. Over time, using feedback from a cognitive service 238, the trained model is robustly versioned (upgraded/improved) to more accurately describe features of that breed of dog. However, if the cognitive engine is later trained to identify a different breed of dog, or even another species such as cats, then a new set of training data is needed to generate a new trained model.

Thus, as shown in FIG. 2, the SCM 202 hosts the code (instructions) that is passed to a cognitive engine build pipeline 204 to generate a cognitive engine. These instructions are initially received by a cognitive build engine 206, which creates an initial version of the cognitive engine. This cognitive engine is tested for basic functionality by a cognitive test engine 208. If the cognitive engine passes the testing of the cognitive test engine 208, then it is stored in a cognitive engine repository 210 of cognitive engines, including the currently created cognitive engine and/or previously created cognitive engines. In one or more embodiments of the present invention, generation of the cognitive engine by the SCM 202 is achieved automatically by innate functions within the SCM 202. In one or more other embodiments of the present invention, these functions are added to the SCM 202.

The SCM 202 also sends instructions to a training engine build pipeline 212 to create a training engine. These instructions are initially received by a training build engine 214, which creates an initial version of the training engine. This training engine is tested by a training test engine 216 for basic functionality, and is then sent to a training deployment engine 218, which sends the tested/deployed training engine 220 to a training pipeline 222.

Within the training pipeline 222, the training engine 220 takes training data from a training data version management database 224, which includes initial data to be used by the training engine 220. The training engine 220, now populated with the initial data from the training data version management database 224, creates a trained model. The trained model is verified by a verification engine 226 as using 1) trusted and accurate data (which may include known test cases) that properly describes some predefined set of circumstances, and 2) is within the proper format for use by the cognitive engine, and therefore is an appropriately verified trained model. The verified trained model is then stored in a trained model version management repository 228.

A cognitive engine and one or more trained models are then retrieved from the cognitive engine repository 210 and the trained model version management repository 228 by a configuration and deployment engine 230, which sends the cognitive engine and one or more trained models to a profile and test engine 232, which 1) ensures that the selected cognitive engine and one or more trained models are working together properly, and 2) ensures that the selected cognitive engine and one or more trained models are appropriate for a cognitive service that has been requested by a user/customer. Once this verification has occurred, then the cognitive engine 234 and one or more trained models 236 are deployed to a cognitive service 238, which provides cognitive computing services to a user/customer.

Configuration and deployment of the training model(s) are dynamic, meaning that they can change in response to various events. For example, consider call-out block 201 ("1. Training source code changes submitted"). Assume that there is an initial version of the training engine 220 and resultant trained model 236, which used training data that was used to build the trained model 236, and which has a training process history identified by metadata that describes the trained model 236. Changing the source code that was used to create the original training engine 220 will result in a different training engine 220 and resulting trained model 236. For example, assume that the original training source code was designed to build trained models using a particular algorithm. If this training source code is changed to include a different machine learning algorithm, for example, one that leads to higher accuracy models, then applying the new training engine on the data (from training data version management database 224) will lead to a different trained model to be created as well as different metadata used to describe the training process history.

In another example, consider call-out block 203, ("2. New training data submitted"). In this example, the source code used to generate the training engine 220 remains the same. However, since new training data is now being supplied to the training data version management database 224, then the resultant training engine 220 and trained model 236 will be different. For example, assume that the original training data consisted of a set of images of dogs. Applying the training engine to this training set produced a trained model for the detection of dogs. Assume now that the training data is changed to a set of images of cats. By reapplying the training engines on this new set of training data, a trained model will be produced that is capable of detecting cats. This new data may be the result of feedback from the user, a manual input of new data, etc.

In another embodiment, consider call-out block 205 ("3. New service version requested"). In this example, a new service has been requested of the cognitive service 238 by a customer/user. As such, a new version of cognitive engine 234 and/or trained model 236 will be needed. For example, assume that the user had been asking the cognitive service 238 to interpret video to identify the number of automobiles that are going through a particular intersection during a certain time of day. If the user later wants to know how many trucks (rather than automobiles) are going through that particular intersection, at the same or different time of day, then the cognitive engine 234 will likely continue to be used, but will now use new data from updated/different trained models 236. However, if the customer now wants to know what the weather is like at this intersection, then a different cognitive engine 234 will be needed. This is accomplished by altering the training engine input 218 used by the training pipeline 222.

Note that arrows also go "backwards" from the cognitive service 238 to the profile and test engine 232 to the configuration and deployment engine 230 to the trained model version management repository 228 to the training engine 220. This "backwards" pathway indicates that the training engine 220 can be adjusted to create new trained models 236 based on feedback from the cognitive service 238 and/or its users. For example, user feedback may indicate "failures of detection in pictures of dogs". Using this feedback, the algorithms used in the training engine can be enhanced to improved detection in the future.

As another example, assume that the cognitive service 238 provides an interactive question and answer service, which allows the user to ask the cognitive service 238 questions about a subject (e.g., general knowledge questions, detailed questions about a particular graph or set of data, performance questions about a particular device being monitored by a set of hardware sensors such as hardware sensor 152 shown in FIG. 1, etc.). If the cognitive service takes longer than a predetermined amount of time, or if the user has to ask more than a predetermined number of follow-up questions to get the answer that he/she needs, then the cognitive engine and/or trained model will be reconfigured based on these performance figures.

Similarly, if the cognitive service 238 supports an intelligent browser system, then a usability metric may be tracked, such as tracking how many websites need to be visited before the user gets to the needed final desired destination (e.g., desired website). If this number of intermediate/transient websites exceeds a predefined number, then the cognitive engine and/or trained model will be reconfigured based on these performance figures.

If there are multiple cognitive engines and/or trained models available for a particular use case, they can be ranked according to their performances (described above). A highest ranked cognitive engine and/or trained model will then be deployed for a particular user/purpose/use.

In another example, the environment in which the cognitive service 238 is deployed may change. For example, assume that the cognitive service 238 was initially tasked with monitoring video images from a video camera at a particular traffic intersection. Later, the cognitive service may be tasked with monitoring a different traffic intersection, and thus images from a new video camera at that new intersection will produce different data than that from produced by the video camera at the earlier traffic intersection. This change will result in a change to the trained model 236, and perhaps even the deployed cognitive engine 234, due to the different features and/or environment of the new intersection.

Figure 3:
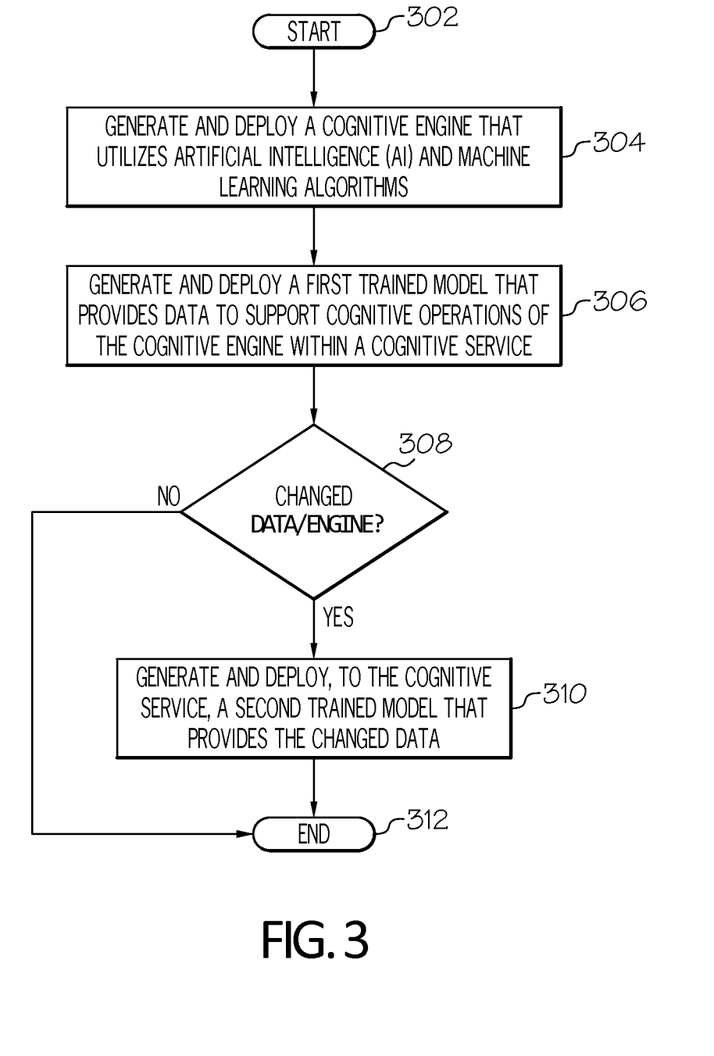
FIG. 3 is a high-level flowchart of one or more steps performed by one or more processors to version trained models used to deliver cognitive services.

With reference now to FIG. 3, a high-level flowchart of one or more steps performed by one or more processors to version trained models used to deliver cognitive services according to one or more embodiments of the present invention is presented.

After initiator block 302, one or more processors obtain and deploy a cognitive engine (e.g., deployed cognitive engine 234 shown in FIG. 2), as described in block 304. As described herein, the cognitive engine utilizes artificial intelligence (AI), machine learning, or similar algorithms. In one embodiment of the present invention, obtaining the cognitive engine is the result of generating a new cognitive engine. In another embodiment of the present invention, the cognitive engine is obtained by retrieving an existing cognitive engine from a database of existing cognitive engines for reuse.

As described in block 306, one or more processors obtain (initially generate and/or retrieve from a database of existing trained models) and deploy a first trained model (e.g., trained model 236 in FIG. 2). The first trained model provides data that supports cognitive operations of the cognitive engine within a cognitive service (e.g., cognitive service 238 in FIG. 2). In one or more embodiments of the present invention, the data include operation data (that is used to create the trained model 236 shown in FIG. 2) as well as provenance data (which describes where the operation data came from). The generation, retrieval and/or deployment of cognitive build engine 206 and cognitive test engine 208 shown in FIG. 2 can be performed in parallel, in the order shown in FIG. 2, or in reverse order.

As described in query block 308, a query is made to determine if any aspect of the training input that was used by the training pipeline (e.g., training pipeline 222 shown in FIG. 2) to generate/retrieve/obtain the first trained model has changed. This training input may be the training data discussed in call-out block 203 in FIG. 2 (e.g., a new photo is being evaluated, new types of images are being examined, different features within the photo are being searched, different types of trends in data are being looked for, etc.), or the training input may be to the training engine itself (e.g., new source code changes to the training engine 220 shown in FIG. 2 are made or an entirely different engine is needed/obtained). That is, a query is made to determine if the training data used by the training engine in the training pipeline, and/or the training engine itself changes. If so, then one or more processors obtain (generate or retrieve) and deploy a second trained model (e.g., a new version of the trained model 236 shown in FIG. 2) to the cognitive service, such that the second trained model was constructed based on the changed training data and/or the changed training engine (see block 310).

Thus, in one or more embodiments of the present invention, the training input that is changed (e.g., as described in blocks 306 and 310) is training data (used to train the cognitive service, which may be use-case data from a present job), and/or executable code (used to create the various engines, including training engine 220, described in FIG. 2).

The flow-chart ends at terminator block 312.

In one embodiment of the present invention, one or more processors obtain (generate or retrieve) multiple trained models using disparate data, and then rank them according to an effectiveness level in enabling the cognitive engine to reach predefined goals. Thereafter, a highest-ranked trained model from the multiple trained models is deployed to the cognitive service. For example, assume that the deployed cognitive engine 234 shown in FIG. 2 searches for images of cats. Assume further that a first trained model describes cats as having attributes of being fast, large, and brown. However, a second trained model describes cats as having attributes of being slow, small, and brown. If the first trained model consistently beats the second trained model (i.e., in examining video to identify lions in the wild), then it is ranked higher than the second trained model (which was designed to identify domestic cats in a home).

In one embodiment of the present invention, one or more processors receives a request for a new service from the cognitive service, which triggers the generation/retrieval of the second trained model by the request for the new service from the cognitive service. (See discussion above related to call-out block 205 ("3. New service version requested") in FIG. 2.)

In one embodiment of the present invention, one or more processors receive feedback indicating that the cognitive service is not meeting predefined performance parameters. In response to receiving feedback indicating that the cognitive service is not meeting the predefined performance parameters, one or more processors generate/retrieve and deploy a new (third) trained model to the cognitive service. That is, if the trained model is not meeting performance parameters (e.g., Service Level Agreements—SLAs), then a new trained model (which may be the second trained model discussed above) is provided, in order to make the cognitive service and cognitive engine perform as required.

In one embodiment of the present invention, one or more processors receive feedback indicating that the cognitive service is not meeting predefined performance parameters. In response to receiving feedback indicating that the cognitive service is not meeting the predefined performance parameters, one or more processors retire the second trained model. That is, in some situations the system will determine that the second trained model in use is simply retired, thus allowing the first trained model to be re-deployed.

In one embodiment of the present invention, one or more processors receive feedback indicating that the cognitive service is not meeting predefined performance parameters. In response to receiving feedback indicating that the cognitive service is not meeting the predefined performance parameters, one or more processors retire the cognitive engine. That is, rather than retiring the trained model, the cognitive engine is retired, thus allowing an alternate cognitive engine to be deployed. The alternate cognitive engine may be based on a previous version of a cognitive engine, or it may be an entirely new cognitive engine.

In one embodiment of the present invention, one or more processors apply a statistical analysis to determine the change to certain characteristics of the data over time. In response to determining by the statistical analysis that the change to characteristics of the data exceeds a predefined limit, one or more processors trigger generation of the second trained model. For example, the training engine 220 shown in FIG. 2 may utilize a statistical analysis program (e.g., SPSS) to determine whether or not a change to data used to create the trained model has changed enough to be significant. In the example of the trained model used to evaluate traffic at an intersection, video images (i.e., data) from a traffic camera during daytime hours may vary slightly when the sky is clear as compared to when the sky is overcast. As such, no new trained model is needed to evaluate images of vehicles crossing the intersection. However, the video images captured by the traffic camera during the daytime may be greatly different than images captured at night under streetlights. More importantly, traffic patterns are likely to be different at night as compared to the day. As such, a new trained model is needed at night.

In one embodiment of the present invention, one or more processors receive an electronic signal, from a hardware sensor, that describes an environment that produces the data in the second trained model. In response to the electronic signal from the hardware sensor indicating that the cognitive service is not meeting predefined performance parameters, one or more processors generate and deploy a third trained model to the cognitive service. Note that the second trained model may actually be an initial trained model and the third trained model may be a replacement/subsequent-trained model.

That is, hardware sensors monitor a particular environment. If that particular environment changes, then a new trained model is created and deployed.

For example, assume that the hardware sensor is a traffic camera described above. If the environment changes (i.e., night falls), then a new trained model may be deployed.

In another example, assume that the hardware sensor is a physical sensor on a unit of equipment, such as a computer, a pump, a generator, a vehicle, a train, an aircraft, etc. Using the example of a train, assume that the hardware sensor is a speedometer that detects that the train has increased it speed from 40 miles per hour to 60 miles per hour. As such, cognitive decisions made by the cognitive service 238 in FIG. 2 on behalf of this train will change. For example, video image capture rate of an external on-board video camera will increase; pre-emptive braking times will increase; braking for curves will be adjusted; etc. These changes to the cognitive service are all caused by reactive changes to the trained model and/or cognitive engine (due to changes detected by the hardware sensor).

In another example, assume that the hardware sensor is a biometric sensor that collects biometric data about a user. Biometric data is data describing a physiological state, physical attribute, or measurement of a physiological condition. Biometric data may include, without limitation, fingerprints, thumbprints, palm prints, footprints, hear rate, retinal patterns, iris patterns, pupil dilation, blood pressure, respiratory rate, body temperature, blood sugar levels, and any other physiological data. Hardware sensors acting as biometric sensors may include, without limitation, fingerprint scanners, palm scanners, thumb print scanners, retinal scanners, iris scanners, wireless blood pressure monitor, heart monitor, thermometer or other body temperature measurement device, blood sugar monitor, microphone capable of detecting heart beats and/or breath sounds, a breathalyzer, or any other type of biometric device. Thus, in this example, assume that a user is having his/her heartrate monitored by a biometric device. If the user's heartrate should spike (e.g., go over 180 beats per minute), this is indicative of a medical event (i.e., tachycardia), causing the implementation of a new trained model that is specific for this type of medical event. Based on these changes to the biometrics of the user, reactive changes to the trained model and/or cognitive engine are implemented.

In another example, assume that the hardware sensor is from a set of chemical sensors that can detect airborne chemicals and/or airborne odor causing elements, molecules, gases, compounds, and/or combinations of molecules, elements, gases, and/or compounds in an air sample, such as, without limitation, an airborne chemical sensor, a gas detector, and/or an electronic nose. In one embodiment, such a set of chemical sensors is implemented as an array of electronic olfactory sensors and a pattern recognition system that detects and recognizes odors and identifies olfactory patterns associated with different odor causing particles. The array of electronic olfactory sensors may include, without limitation, metal oxide semiconductors (MOS), conducting polymers (CP), quartz crystal microbalance, surface acoustic wave (SAW), and field effect transistors (MOSFET). The particles detected by set of chemical sensors may include, without limitation, atoms, molecules, elements, gases, compounds, or any type of airborne odor causing matter. In this example, assume that the chemical sensors detect the new presence of a hazardous chemical in an environment being monitored by the cognitive service. The initial trained model may not be equipped with data needed by the deployed cognitive engine to respond to this emergency event (e.g., a gas release). Based on the new readings from the chemical sensor, a new trained model is obtained (i.e., newly created or a previous model is retrieved for reuse), and deployed to the cognitive service, allowing the cognitive service to provide intelligence needed to handle the event (e.g., engaging an actuator to shut down a pipeline, activating a warning alarm, turning on ventilation fans, etc.).

In one embodiment of the present invention, the hardware sensor is from a set of audio sensors that detect, capture, and/or record vibrations, such as, without limitation, pressure waves, and sound waves. Vibrations may be detected as the vibrations are transmitted through any medium, such as, a solid object, a liquid, a semisolid, or a gas, such as the air or atmosphere. Such audio sensors may be implemented as any type of device that can detect vibrations transmitted through a medium, such as, without limitation, a microphone, a sonar device, an acoustic identification system, or any other device capable of detecting vibrations transmitted through a medium. For example, assume that an audio sensor (e.g., a microphone) detects the sound of movement of an ocean floor that is indicative of a subsea earthquake. The trained model may be specific for listening for marine traffic, and thus is not equipped to provide data to a cognitive engine when responding to an earthquake (and the likely resultant tsunami). Thus, a new trained model for such a scenario is obtained (created and/or retrieved) and deployed based on the sonic readings generated by the audio sensors, thus allowing the cognitive service to "understand" and respond to the seismic event.

In one embodiment of the present invention, one or more processors receive an electronic signal from a hardware sensor, where the electronic signal describes an environment that produces the data in the second trained model. In response to the electronic signal from the hardware sensor indicating that the cognitive service is not meeting predefined performance parameters, one or more processors retrieve and deploy an alternate cognitive engine paired with new data that supports the alternate cognitive engine. That is, based on the sensor readings, an entirely new alternate cognitive engine is created, and then paired with training data that comes from the sensor readings.

The present invention may be implemented using cloud computing, as now described. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
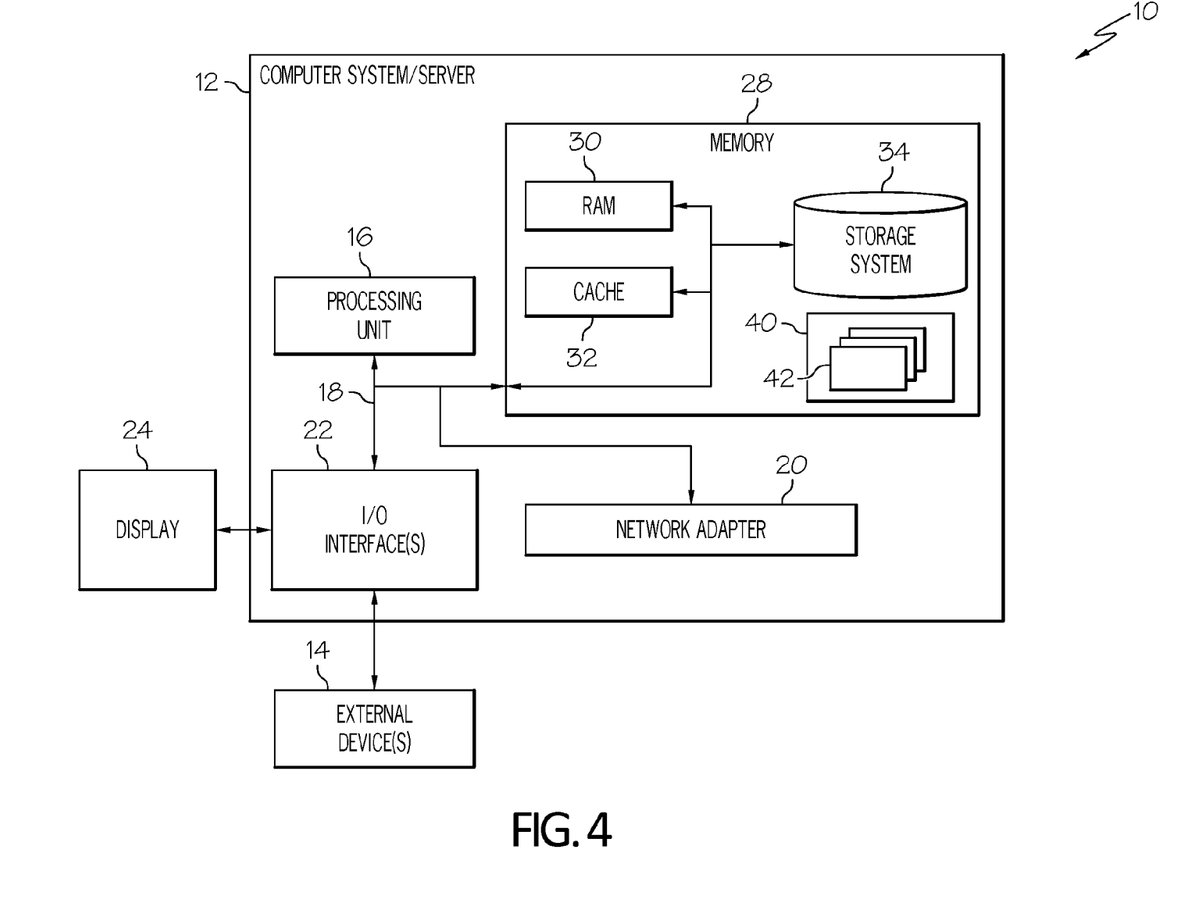
FIG. 4 depicts a cloud computing node according to an embodiment of the present disclosure.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
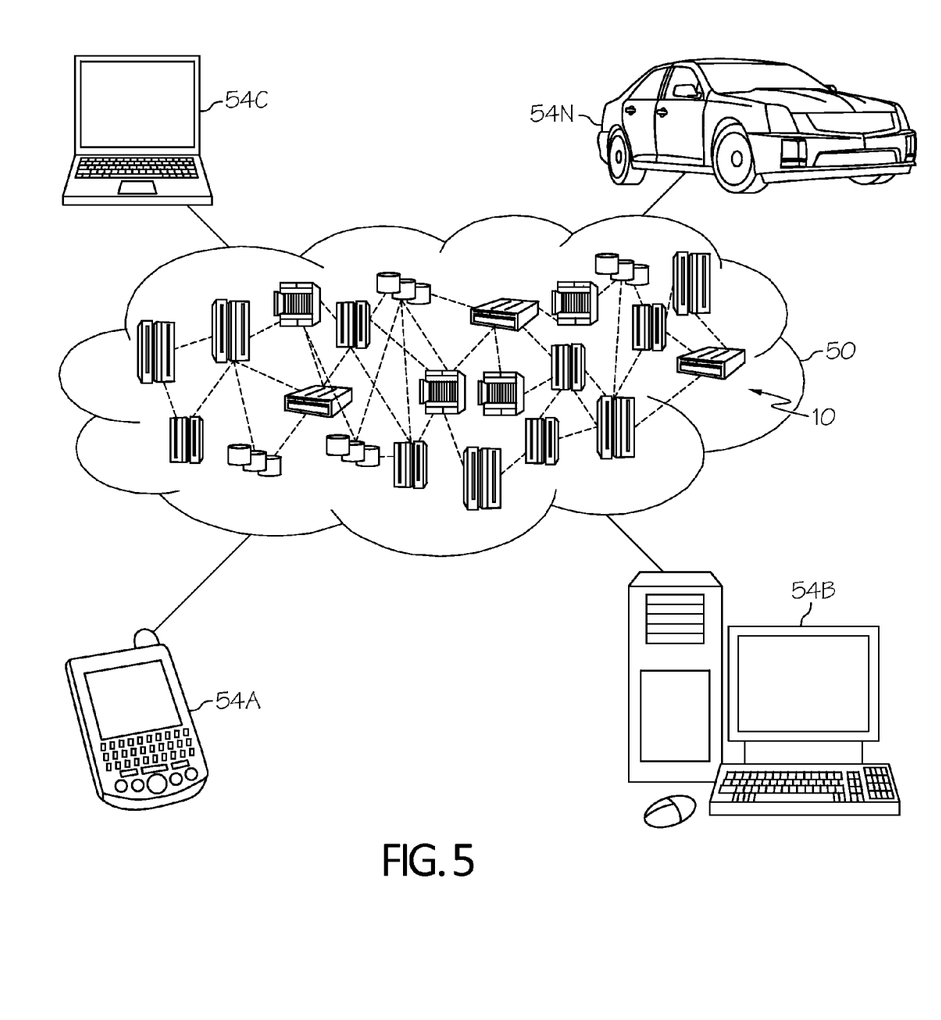
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 5 are intended to be illustrative only and that computing nodes 10 and cloud computing environment 50 can communicate with any type of computerized device over any type of network and/or network addressable connection (e.g., using a web browser).

Figure 6:
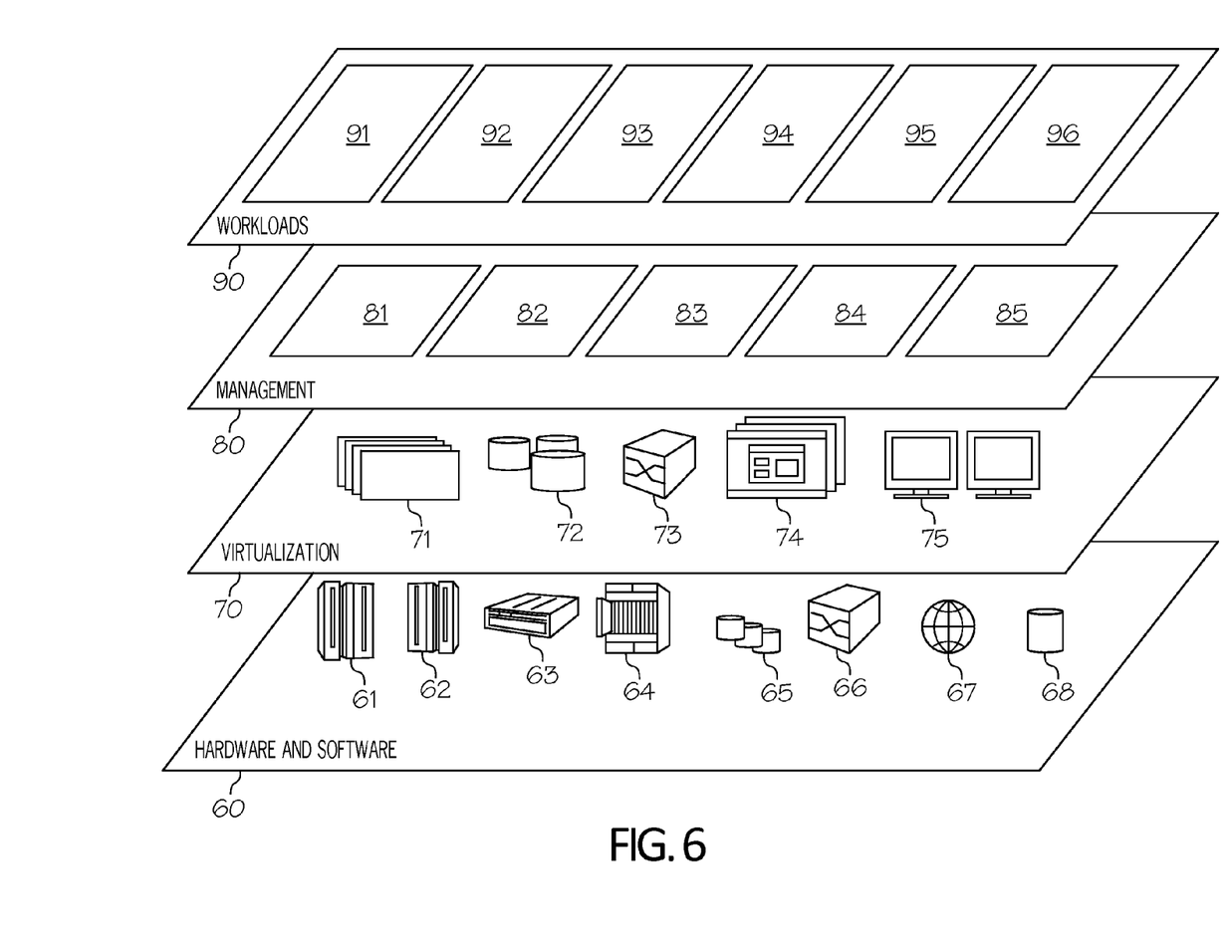
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trained model versioning processing 96 (for versioning/updating trained models of data used to support cognitive services as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer implemented method of managing versions of trained models used to deliver cognitive services, wherein a trained model is a set of data that has been created to describe a process, and wherein the set of data is used as input to a cognitive engine that enables the cognitive engine to emulate a reasoning process, and wherein the computer implemented method comprises:

obtaining and deploying, by one or more processors, the cognitive engine to a cognitive service, wherein the cognitive engine utilizes machine learning algorithms;

obtaining and deploying, by one or more processors, a first trained model to the cognitive service, wherein the first trained model is created by a training engine in a training pipeline, wherein the training engine in the training pipeline utilizes training data to create the first trained model, wherein the first trained model is verified by a verification engine in the training pipeline that verifies that data used to create the first trained model is an accurate copy of data that came from a trusted and known test case that accurately describes the process;

in response to a change to a training input used by the training pipeline, obtaining and deploying, by one or more processors, a second trained model to the cognitive service, wherein the second trained model incorporates the change to the training input used by the training pipeline; and delivering, by one or more processors, a cognitive computing service to a user, wherein the cognitive computing service utilizes the second trained model as input to the cognitive engine;

receiving, by one or more processors, feedback indicating that the cognitive service is not meeting predefined performance parameters; and in response to receiving the feedback indicating that the cognitive service is not meeting the predefined performance parameters, obtaining and deploying, by one or more processors, a third trained model to the cognitive service;

wherein the feedback comprises a quantity of follow-up questions from the user of the cognitive engine which exceeds a predefined number, and wherein the quantity of follow-up questions ask detailed questions from the user of the cognitive engine about an answer provided by the cognitive engine to an initial question from the user.

2. The computer implemented method of claim 1, wherein the change to the training input is a change to the training data that was used by the training engine to create the first trained model.

3. The computer implemented method of claim 1, wherein the change to the training input is a change to software code that defines the training engine.

4. The computer implemented method of claim 1, further comprising:
obtaining, by one or more processors, multiple trained models using disparate data;
ranking, by one or more processors, the multiple trained models according to an effectiveness level in enabling the cognitive engine to reach predefined goals; and
deploying, by one or more processors, a highest-ranked trained model from the multiple trained models to the cognitive service.

5. The computer implemented method of claim 1, further comprising:
receiving, by one or more processors, a request for a new service from the cognitive service, wherein the first trained model supports a previous service that is different from the new service, and wherein the first trained model does not support the new service; and
triggering, by one or more processors, generation of the second trained model by the request for the new service from the cognitive service.

6. The computer implemented method of claim 1, wherein the cognitive service supports an intelligent browser service, and wherein the computer implemented method further comprises:
determining, by one or more processors, that the intelligent browser service has directed the user to visit more than a predetermined quantity of websites before reaching a website that provides an answer to a question from the user; and
in response to determining that the intelligent browser service has directed the user to visit more than the predetermined quantity of websites before reaching the website that provides the answer to the question from the user, further reconfiguring, by one or more processors, the cognitive engine and the third trained model.

7. The computer implemented method of claim 1, further comprising:
applying, by one or more processors, a statistical analysis to the change to the training input; and
in response to determining by the statistical analysis that the change to the training input exceeds a predefined limit, triggering, by one or more processors, generation of an alternate trained model.

8. The computer-implemented method of claim 1, further comprising:
applying, by one or more processors, a machine learning technique to determine a change to predetermined characteristics of the training input; and
in response to determining by the machine learning technique that a degree of change to the training input exceeds a predefined limit, triggering, by one or more processors, generation of an alternate trained model.

9. The computer-implemented method of claim 1, further comprising:
receiving, by one or more processors, an electronic signal from a hardware sensor that is on a unit of equipment, wherein the electronic signal describes a change to a motion of the unit of equipment, and wherein the second trained model is generated using information from the electronic signal; and
in response to the electronic signal from the hardware sensor indicating that the cognitive service is not meeting predefined performance parameters, further deploying, by one or more processors, the third trained model to the cognitive service.

10. The computer-implemented method of claim 1, further comprising:
receiving, by one or more processors, an electronic signal from a hardware sensor, wherein the electronic signal describes an environment of the hardware sensor, and wherein the second trained model is generated using information from the electronic signal; and
in response to the electronic signal from the hardware sensor indicating that the cognitive service is not meeting predefined performance parameters, obtaining and deploying, by one or more processors, an alternate cognitive engine paired with new training data that supports the alternate cognitive engine.

11. The computer implemented method of claim 1, further comprising:
receiving, by one or more processors, an electronic signal from a hardware sensor on a device, wherein the electronic signal describes an anomalous physical environment of the device, and wherein the second trained model is generated using information from the electronic signal; and
in response to the electronic signal from the hardware sensor indicating the anomalous physical environment of the device, activating, by the cognitive service, an amelioration device to ameliorate the anomalous physical environment of the device.

12. The computer implemented method of claim 1, wherein the cognitive service is initially monitoring video images at a first location, and wherein the computer implemented method further comprises:
determining, by one or more processors, that the cognitive service has stopped monitoring video images at the first location and is currently monitoring video images at a second location; and in response to determining that the cognitive service has stopped monitoring video images at the first location and is currently monitoring video images at the second location, reconfiguring, by one or more processors, the cognitive engine and the third trained model.

13. The computer implemented method of claim 1, further comprising:
creating an upgraded training engine by changing training source code that initially created the training engine; and
using the second trained model as inputs to the upgraded training engine to generate the third trained model and to generate metadata that describes operations in claim 1.

14. A computer program product for versioning trained models used to deliver cognitive services, wherein a trained model is a set of data that has been created to describe an environment, and wherein the set of data is used as input to a cognitive engine that enables the cognitive engine to exhibit cognitive behavior, the computer program product comprising a non-transitory computer readable storage medium having program code embodied therewith, the program code readable and executable by a processor to perform a method comprising:
obtaining and deploying the cognitive engine to a cognitive service, wherein the cognitive engine utilizes machine learning algorithms;
obtaining and deploying a first trained model to the cognitive service, wherein the first trained model is created by a training engine in a training pipeline, and wherein the training engine in the training pipeline utilizes training data to create the first trained model, wherein the first trained model is verified by a verification engine in the training pipeline that verifies that data used to create the first trained model is an accurate copy of data that came from a trusted and known test case that accurately describes the environment, and wherein the first trained model is verified by the verification engine to verify that the first trained model is within a proper format for use by the cognitive engine;
in response to a change to a training input used by the training pipeline, obtaining and deploying a second trained model to the cognitive service, wherein the second trained model incorporates the change to the training input used by the training pipeline;
delivering a cognitive computing service to a user, wherein the cognitive computing service utilizes the second trained model as input to the cognitive engine;
receiving feedback indicating that the cognitive service is not meeting predefined performance parameters; and
in response to receiving the feedback indicating that the cognitive service is not meeting the predefined performance parameters, obtaining and deploying a third trained model to the cognitive service;
wherein the feedback comprises a quantity of follow-up questions from the user of the cognitive engine which exceeds a predefined number, and wherein the quantity of follow-up questions ask detailed questions from the user of the cognitive engine about an answer provided by the cognitive engine to an initial question from the user.

15. The computer program product of claim 14, wherein the change to the training input is a change to the training data that was used by the training engine to create the first trained model.

16. The computer program product of claim 14, wherein the change to the training input is a change to software code that defines the training engine.

17. The computer program product of claim 14, wherein the method further comprises:
generating multiple trained models using disparate data;
ranking the multiple trained models according to an effectiveness level in enabling the cognitive engine to reach predefined goals; and
deploying a highest-ranked trained model from the multiple trained models to the cognitive service.

18. A computer system comprising:
a processor, a computer readable memory, and a non-transitory computer readable storage medium;
first program instructions to obtain and deploy a cognitive engine, wherein the cognitive engine utilizes artificial intelligence (AI) and machine learning algorithms;
second program instructions to obtain and deploy a first trained model, wherein the first trained model is a set of data that has been created to describe a type of entity depicted in a photographic image, and wherein the set of data is used as input to the cognitive engine that enables the cognitive engine to exhibit cognitive behavior for identifying the type of entity depicted in the photographic image, wherein the first trained model incorporates data that supports cognitive operations of the cognitive engine within a cognitive service, wherein the first trained model is verified by a verification engine in the training pipeline that verifies that data used to create the first trained model is an accurate copy of data that came from a trusted and known test case that accurately describes the type of entity depicted in the photographic image, and wherein the first trained model is verified by the verification engine to verify that the first trained model is within a proper format for use by the cognitive engine;
third program instructions to, in response to a change to the data that was incorporated by the first trained model resulting in changed data, obtain and deploy a second trained model to the cognitive service, wherein the second trained model incorporates the changed data;
fourth program instructions to deliver a cognitive computing service to a user, wherein the cognitive computing service utilizes the second trained model as input to the cognitive engine;
fifth program instructions to receive feedback indicating that the cognitive service is not meeting predefined performance parameters; and
sixth program instructions to, in response to receiving the feedback indicating that the cognitive service is not meeting the predefined performance parameters, obtain and deploy a third trained model to the cognitive service;
wherein the feedback comprises a quantity of follow-up questions from the user of the cognitive engine which exceeds a predefined number, and wherein the quantity of follow-up questions ask detailed questions from the user of the cognitive engine about an answer provided by the cognitive engine to an initial question from the user;
and wherein the first, second, third, fourth, fifth, and sixth program instructions are stored on the non-transitory computer readable storage medium for execution by one or more processors via the computer readable memory.

* * * * *